United States Patent
Yamada

(10) Patent No.: US 8,925,962 B2
(45) Date of Patent: Jan. 6, 2015

(54) VEHICLE AIRBAG STRUCTURE

(75) Inventor: Akihiro Yamada, Yokohama (JP)

(73) Assignee: Autoliv Development AB, Vårgårda (SE)

( * ) Notice: Subject to any disclaimer, the term of this patent is extended or adjusted under 35 U.S.C. 154(b) by 0 days.

(21) Appl. No.: 13/884,483

(22) PCT Filed: Nov. 7, 2011

(86) PCT No.: PCT/JP2011/075550
§ 371 (c)(1),
(2), (4) Date: May 9, 2013

(87) PCT Pub. No.: WO2012/063760
PCT Pub. Date: May 18, 2012

(65) Prior Publication Data
US 2013/0221645 A1    Aug. 29, 2013

(30) Foreign Application Priority Data

Nov. 9, 2010    (JP) ................................ 2010-251325

(51) Int. Cl.
| B60R 21/231 | (2011.01) |
| B60R 21/2334 | (2011.01) |
| B60R 21/233 | (2006.01) |
| B60R 21/2346 | (2011.01) |

(52) U.S. Cl.
CPC .......... *B60R 21/2334* (2013.01); *B60R 21/233* (2013.01); *B60R 21/2346* (2013.01); *B60R 2021/23324* (2013.01)
USPC .......................... 280/731; 280/729; 280/743.1

(58) Field of Classification Search
CPC ................ B60R 21/203; B60R 21/233; B60R 2021/2334
USPC ....................................... 280/729, 731, 743.1
See application file for complete search history.

(56) References Cited

U.S. PATENT DOCUMENTS

| 5,573,270 A * | 11/1996 | Sogi et al. ............... 280/740 |
| 6,224,101 B1 * | 5/2001 | Nishijima et al. ........ 280/743.2 |
| 6,371,509 B1 * | 4/2002 | Ellerbrok et al. ............ 280/729 |

(Continued)

FOREIGN PATENT DOCUMENTS

| DE | 10030488 A1 | 1/2002 |
| EP | 1167128 A2 | 1/2002 |

(Continued)

OTHER PUBLICATIONS

Naohiko Ishiguro, Airbag Device, Jan. 29, 2009, JPO, JP 2009-018730 A, Machine Translation of Description.*

(Continued)

*Primary Examiner* — James English
(74) *Attorney, Agent, or Firm* — Brinks Gilson & Lione

(57) ABSTRACT

A vehicle airbag structure deploying an airbag at a predetermined designed position in an initial stage of deployment, while suppressing a swinging motion, to allow the airbag to continuously deploy and inflate toward a vehicle seat and reliably receive an occupant at an appropriate position. The vehicle airbag structure includes: an intermediate panel provided between a front panel and a rear panel; a joining the rear panel and the front panel to form an airbag; an intermediate panel forming a gas duct to guide inflator gas; and a gas circulation hole formed by a portion of the intermediate panel facing in a circumferential direction to generate, inside the airbag, a gas flow in the circumferential direction.

17 Claims, 24 Drawing Sheets

(56) References Cited

U.S. PATENT DOCUMENTS

| | | | |
|---|---|---|---|
| 6,471,244 B1* | 10/2002 | Nishijima et al. | 280/742 |
| 6,626,459 B2* | 9/2003 | Takimoto et al. | 280/731 |
| 6,926,303 B2* | 8/2005 | Fischer et al. | 280/729 |
| 7,380,822 B2* | 6/2008 | Abe | 280/743.1 |
| 7,543,850 B2* | 6/2009 | Bachraty et al. | 280/743.1 |
| 2002/0005639 A1 | 1/2002 | Varcus | |
| 2002/0038949 A1 | 4/2002 | Okada et al. | |
| 2002/0067032 A1* | 6/2002 | Ishikawa | 280/743.1 |
| 2005/0285379 A1* | 12/2005 | Soderquist | 280/740 |
| 2006/0197320 A1* | 9/2006 | Abe | 280/729 |
| 2007/0024040 A1 | 2/2007 | Kai et al. | |
| 2007/0145726 A1 | 6/2007 | Ochiai et al. | |
| 2013/0313809 A1* | 11/2013 | Yamaji | 280/729 |

FOREIGN PATENT DOCUMENTS

| | | |
|---|---|---|
| JP | 5262195 A | 10/1993 |
| JP | 2002-029354 A | 1/2002 |
| JP | 2002-053000 A | 2/2002 |
| JP | 2007-030765 A | 2/2007 |
| JP | 2007-176353 A | 7/2007 |
| JP | 2009-018730 A | 1/2009 |

OTHER PUBLICATIONS

International Search Report of PCT/JP2011/075550, Mailed on Feb. 7, 2012, 4 pages.

* cited by examiner

VEHICLE AIRBAG STRUCTURE

BACKGROUND

1. Field of the Invention

The present invention relates to a vehicle airbag structure capable of stably and quickly deploying an airbag at a predetermined designed position during an initial stage of deployment while suppressing a swinging motion to allow the airbag to continuously deploy and inflate toward a vehicle seat and capable of reliably receiving an occupant at an appropriate position.

2. Description of Related Technology

Japanese Patent Application Laid-open No. H5-262195 discloses a vehicle airbag structure for a driver's seat or a passenger seat, configured to control the process of deployment and inflation of an airbag before the inflation is finally completed.

The "passenger seat airbag device" disclosed in Japanese Patent Application Laid-open No. H5-262195 aims to allow an airbag to preliminarily deploy in a vertical direction or a horizontal direction as seen from an occupant on the passenger seat and to finally allow the airbag to deploy in an originally designed shape of the airbag. In this airbag device, the airbag is folded and stored in a container and a lid covers a front opening of the container. An inner bag is disposed inside the airbag, and openings for guiding gas from an inflator in a vertical direction are formed in the inner bag. When the inflator operates so that gas is discharged into the container, the gas deploys the inner bag to press the airbag and the lid, whereby the lid is opened. The gas from the inflator is discharged in the vertical direction through the openings to allow the airbag to preliminarily deploy in the vertical direction and to allow the airbag to finally deploy in an originally designed shape of the airbag. Thus, in the process of deployment of the airbag, the airbag will not project toward an occupant of the vehicle.

However, when openings for guiding gas in the vertical direction are formed in the inner bag, and gas is discharged in the vertical direction through the openings, the airbag may swing greatly and repeatedly in the vertical direction about the container to which the airbag is attached. When such a swinging motion occurs, the airbag may not be able to stably deploy at a predetermined designed position. The airbag that does not stably deploy at a designed position and swings greatly to cause a positional shift, such as floating, may be unable to reliably receive an occupant at an appropriate position even if the airbag deploys in an originally designed shape, and the risk of injuries to the occupant may increase. Naturally, even when gas is discharged in the horizontal direction, the airbag may repeatedly swing in the horizontal direction, and the same problems may occur.

SUMMARY

The present invention has been made in view of the problems of the conventional art, and an object of the present invention is to provide a vehicle airbag structure capable of stably and quickly deploying an airbag at a designed position in an initial stage of deployment while suppressing a swinging motion to allow the airbag to continuously deploy and inflate toward a vehicle seat and capable of reliably receiving an occupant at an appropriate position.

A vehicle airbag structure according to the present invention includes: a rear panel having a gas inlet portion for an inflator gas and attached and fixed to a vehicle body; a front panel capable of deploying and inflating toward a vehicle seat by the inflator gas; an intermediate panel provided to be superimposed between the front panel and the rear panel; a ring-shaped seam joining at least the rear panel and the front panel in a ring shape to form an airbag; a duct seam joining the intermediate panel and the rear panel to form a gas duct between the intermediate panel and the rear panel so as to guide the inflator gas from the gas inlet portion; and a gas circulation hole communicating with the gas duct and formed by a peripheral edge of the intermediate panel so as to face in a circumferential direction of the ring-shaped seam to generate, inside the airbag, a gas flow of the inflator gas in the circumferential direction of the ring-shaped seam.

The peripheral edge of the intermediate panel is formed by a slit provided in the intermediate panel, and the gas duct is formed across the gas inlet portion and the slit.

The slit is formed in plurality, and a region surrounded by two adjacent slits and the duct seam is configured as a non-inflating region by joining the intermediate panel and the rear panel.

A penetration hole for circulating the inflator gas from the gas duct into the airbag is formed in the intermediate panel.

A tether connected to the front panel is provided in the intermediate panel in order to control deployment and inflation of the front panel.

The vehicle airbag structure further includes an additional gas circulation hole communicating with the gas duct and formed by the peripheral edge of the intermediate panel in a direction facing the ring-shaped seam to generate, inside the airbag, a gas flow of the inflator gas toward the ring-shaped seam.

A vehicle airbag structure according to the present invention includes: a rear panel attached and fixed to a vehicle body; a front panel capable of deploying and inflating toward a vehicle seat by an inflator gas; a gas duct provided between the front panel and the rear panel so as to be joined to at least the rear panel or the front panel, and having a gas inlet portion for the inflator gas; a ring-shaped seam joining the rear panel and the front panel in a ring shape to form an airbag; and a gas circulation hole formed in the gas duct so as to face in a circumferential direction of the ring-shaped seam to generate, inside the airbag, a gas flow of the inflator gas in the circumferential direction of the ring-shaped seam.

The vehicle airbag structure further includes an additional gas circulation hole formed in the gas duct in a direction facing the ring-shaped seam to generate, inside the airbag, a gas flow of the inflator gas toward the ring-shaped seam.

The gas circulation hole is formed in plurality, and the gas circulation holes have different hole diameters in order to adjust a flow rate of the inflator gas from each of the gas circulation holes.

In the vehicle airbag structure according to the present invention, it is possible to stably and quickly deploy an airbag at a predetermined designed position in an initial stage of deployment while suppressing a swinging motion to allow the airbag to continuously deploy and inflate toward a vehicle seat and to reliably receive an occupant at an appropriate position.

DETAILED DESCRIPTION

Figure 1:
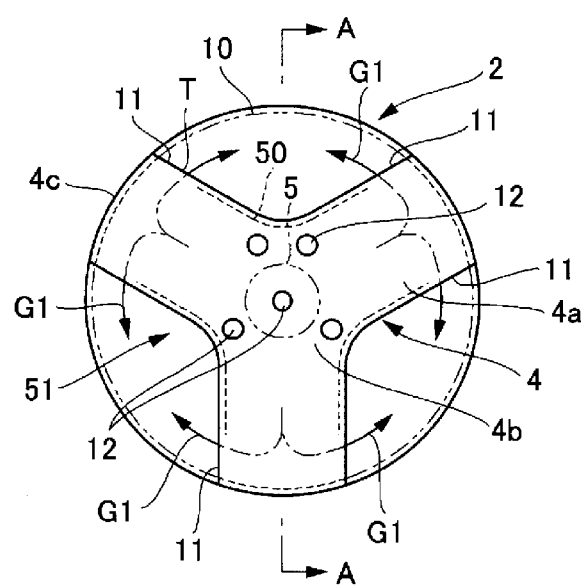
FIG. 1 is a front view of a state where a front panel is removed, showing a first embodiment of a vehicle airbag structure according to the present invention.
Figure 2:
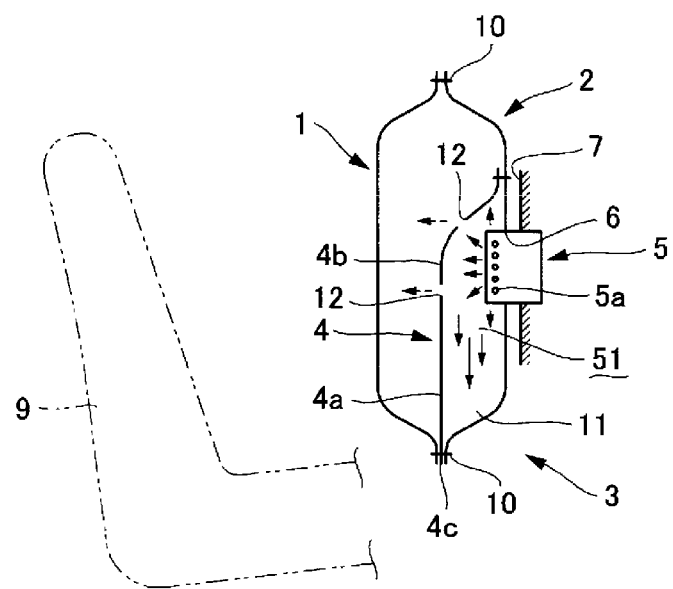
FIG. 2 is a cross-sectional view along line A-A in FIG. 1, showing the state where the front panel is attached.
Figure 3:
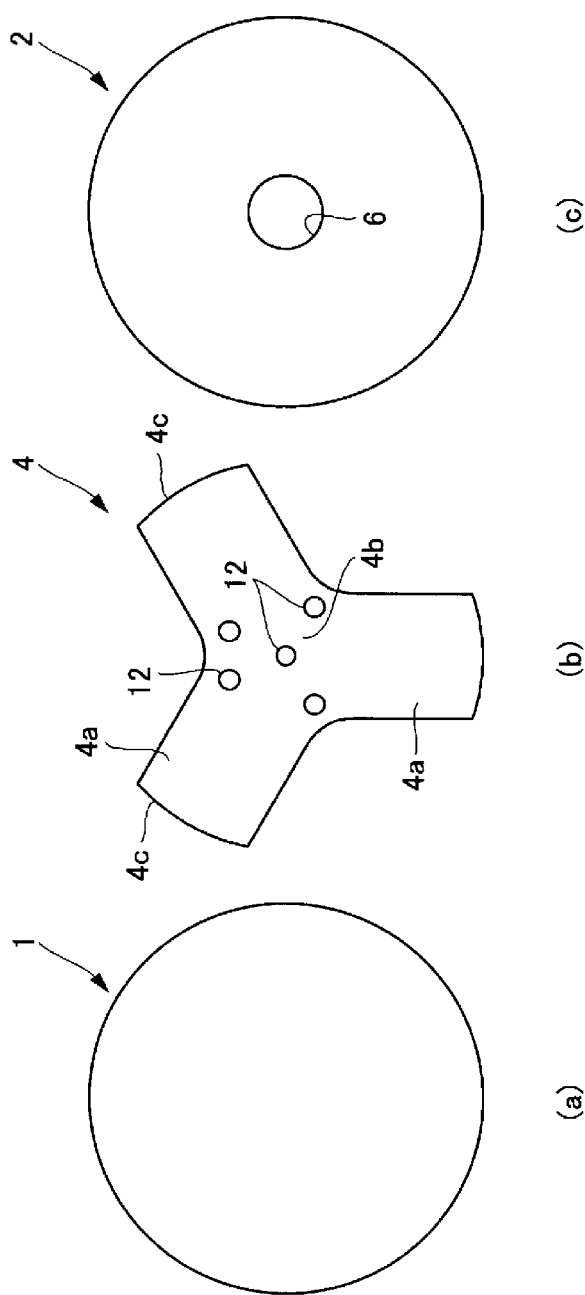
FIGS. 3(a)-3(c) are explanatory diagrams for explaining main constituent elements of an airbag shown in FIG. 1.

Hereinafter, preferred embodiments of a vehicle airbag structure according to the present invention will be described in detail with reference to the accompanying drawings. As shown in FIGS. 1 to 4, a vehicle airbag structure according to a first embodiment mainly includes an airbag 3 formed of a front panel 1 (see FIG. 3A) and a rear panel 2 (see FIG. 3C) and an intermediate panel 4 (see FIG. 3B) provided inside the airbag 3 so as to be superimposed between the front panel 1 and the rear panel 2.

The rear panel 2 is made from fabrics, and in the shown example, has an external shape that is approximately circular. The external shape is not limited to a circular shape but may be other shapes such as a quadrangular shape. An outer circumferential portion of the rear panel 2 is a portion that is joined to the front panel 1.

A fitting hole 6 in which an inflator 5 that discharges an inflator gas is inserted is formed in the rear panel 2. The inflator 5 is inserted in the fitting hole 6 so that gas discharging holes 5a are positioned inside the airbag 3, and is attached to the rear panel 2. Thus, the fitting hole 6 of the rear panel 2 is set as a gas inlet portion of the inflator gas.

The rear panel 2 is attached and fixed directly to a vehicle body 7 or with the inflator 5 attached to the rear panel 2 interposed. The rear panel 2 is fixed to a boss 8a (see FIG. 4) of a steering wheel 8 or the like if the airbag is a driver's seat airbag, and is fixed to a steering support member or the like inside an instrument panel if the airbag is a passenger seat.

The front panel 1 is also made from fabrics, and in the shown example, has an external shape that is approximately circular to match the rear panel 2. The external shape of the front panel 1 may also be other shapes such as a quadrangular shape. An outer circumferential portion of the front panel 1 is a portion that is joined to the rear panel 2. As known in the art, the front panel 1 is configured to deploy and inflate toward a vehicle seat 9 of a driver's seat or a passenger seat when an inflator gas flows into the airbag 3.

The airbag 3 is formed in a bag shape by a ring-shaped seam 10 that joins the outer circumferential portions of the front panel 1 and the rear panel 2 in a ring shape. In the present embodiment, the ring-shaped seam 10 is formed in an approximately circular shape.

Since the ring-shaped seam 10 joins the outer circumferential portions of the front panel 1 inflating toward the vehicle seat 9 and the rear panel 2 fixed to the vehicle body 7, the ring-shaped seam 10 is positioned between the vehicle seat 9 for a driver's seat and the steering wheel 8 (see FIG. 4) or between a vehicle seat for a passenger seat and an instrument panel to restrict deployment and inflation in vertical and horizontal directions of a vehicle.

As a method of forming the ring-shaped seam 10, various well-known methods such as sewing, adhesive bonding, or weaving can be employed. When the airbag 3 is mounted on a vehicle, the airbag 3 is stored in a storage space (not shown) provided in the vehicle body 7 in a state of being folded.

The intermediate panel 4 is made from fabrics and is disposed between the rear panel 2 and the front panel 1 so as to cover the inflator 5 and the gas discharging holes 5a. The intermediate panel 4 is joined to the rear panel 2 by a duct seam 50. Moreover, the intermediate panel 4 forms a gas circulation hole 11 inside the airbag 3 so as to generate a gas flow of the inflator gas.

In the present embodiment, the intermediate panel 4 has such an approximately Y-shaped external shape that extension portions 4a having an appropriate width extend radially from the center 4b. These extension portions 4a are formed at an equal interval in the circumferential direction of the ring-shaped seam 10. The external shape is not limited to the Y-shape, but for example, such a shape that the extension portions 4a having an appropriate width extend radially from the center 4b such as an X-shape or a star shape, or an I-shape as in a modification described later may be used. The center 4b of the intermediate panel 4 is set to a position corresponding to the fitting hole 6 of the rear panel 2.

A peripheral edge that forms the external shape of the intermediate panel 4 is joined to the rear panel 2 by the duct seam 50. As a method of forming the duct seam 50, various well-known methods can be employed similarly to the ring-shaped seam 10. When outermost peripheral edges 4c of the intermediate panel 4 reach the ring-shaped seam 10, all of the outermost peripheral edges 4c may be joined to the rear panel 2 and the front panel 1 by the ring-shaped seam 10.

Since the intermediate panel 4 is provided so as to cover the inflator 5 attached to the rear panel 2 and the gas discharging holes 5a, when the intermediate panel 4 and the rear panel 2 are joined by being surrounded by the duct seam 50, a gas duct 51 that communicates with the fitting hole 6 of the rear panel 2, which is a gas inlet portion, so as to guide the inflator gas is formed between the intermediate panel 4 and the rear panel 2. Thus, the inflator gas flows first into the gas duct 51.

Non-joined portions T that are not joined by the duct seam 50 are provided in the peripheral edge of the intermediate panel 4, whereby gas circulation holes 11 communicating with the gas duct 51 and the inside of the airbag 3 are formed in the airbag 3. Specifically, distal side edges that are closer to the distal end (the distal end of the radial form) of the extension portion 4a of the intermediate panel 4 and face in the circumferential direction of the ring-shaped seam 10 are set as the non-joined portions T. By setting such distal side edges as the non-joined portions T, the formed gas circulation holes 11 communicate with the gas duct 51 and are formed to face in the circumferential direction of the ring-shaped seam 10. The gas circulation holes 11 float from the rear panel 2 according to the pressure of the inflator gas introduced from the gas inlet portion, whereby the gas circulation holes 11 are opened. From the opened gas circulation holes 11, a gas flow G1 of the inflator gas flowing in the circumferential direction of the ring-shaped seam 10 is generated inside the airbag 3 along the gas circulation holes 11.

In the present embodiment, the ring-shaped seam 10 is circular, the non-joined portions T are set in an appropriate size so as to face from the outermost peripheral edge 4c of the intermediate panel 4 toward the center 4b so that the inflator gas flows along the inner edge of the circular ring-shaped seam 10, and the gas circulation holes 11 are formed by the non-joined portions T of the peripheral edge of the intermediate panel 4. The duct seam 50 forms the gas duct 51 between the rear panel 2 and the intermediate panel 4 superimposed on the rear panel 2 so as to face across the gas inlet portion and the gas circulation holes 11, and the gas duct 51 guides the inflator gas from the gas inlet portion to the gas circulation holes 11. Due to this, the inflator gas flowing first into the gas duct 51 is discharged from the gas circulation holes 11 and generates, inside the airbag 3, the gas flow G1 along the inner edge of the ring-shaped seam 10.

In the present embodiment, the gas circulation hole 11 is formed in each of the three extension portions 4a of the Y-shaped intermediate panel 4. Moreover, a pair of gas circulation holes 11 is formed on both left and right sides in the width direction of the extension portion 4a in such an arrangement that the holes face each other and communicate with each other in order to discharge the inflator gas evenly in opposite horizontal directions. Thus, in the present embodiment, six gas circulation holes 11 are formed along the ring-shaped seam 10.

Penetration holes 12 for circulating the inflator gas from the gas duct 51 into the airbag 3 are formed in the intermediate panel 4. In the shown example, the penetration holes 12 are formed so as to penetrate in the front-back direction (for example, from the vehicle body 7 to the vehicle seat 9: see FIG. 2) of the airbag 3. Due to these penetration holes 12, a portion of the inflator gas introduced into the gas duct 51 functions as a pilot gas that is discharged into the airbag 3 to cause initial deployment of the front panel 1 and assists the deployment and inflation of the airbag 3 using the inflator gas from the gas circulation holes 11.

The penetration holes 12 are formed at the center 4b of the intermediate panel 4 and at positions around the center 4b to be separated from the gas circulation holes 11 in order to allow the inflator gas discharged from the penetration holes 12 to function independently.

Next, the operation of the vehicle airbag structure according to the present embodiment will be described. In manufacturing of the vehicle airbag structure, the rear panel 2 and the intermediate panel 4, excluding the non-joined portions T serving as the gas circulation holes 11, are joined by the duct seam 50, and then the front panel 1 and the rear panel 2 are joined, whereby the airbag 3 having the intermediate panel 4 can be formed. The outermost peripheral edges 4c of the intermediate panel 4 may be joined to the rear panel 2 only and may be joined in a state of being interposed between the front panel 1 and the rear panel 2.

Subsequently, the inflator 5 is inserted and attached to the fitting hole 6 of the rear panel 2 which is the gas inlet portion, and then, the airbag 3 is folded, and the rear panel 2 of the folded airbag 3 and the inflator 5 are attached and fixed to the vehicle body 7 and are stored in a predetermined storage space.

The inflator gas discharged from the gas discharging holes 5a according to the action of the inflator 5 flows first into the gas duct 51. The inflator gas flowing into the gas duct 51 flows toward the gas circulation holes 11 while deploying the rear panel 2 and the intermediate panel 4 to swell the gas duct 51.

Moreover, a portion of the inflator gas is discharged from the gas duct 51 toward the front panel 1 through the penetration holes 12 earlier than the inflator gas that reaches the gas circulation holes 11. The inflator gas discharged from the penetration holes 12 triggers the deployment of the front panel 1 as a pilot gas to assist the subsequent deployment of the front panel 1.

The inflator gas flowing toward the gas circulation holes 11 reaches the ring-shaped seam 10 and is then discharged from the gas circulation holes 11 into the airbag 3. The discharged inflator gas forms the gas flow G1 that flows in the circumferential direction of the ring-shaped seam 10 along the gas circulation holes 11 to deploy the entire inner edge of the ring-shaped seam 10 so that the airbag 3 is inflated. Thus, a strongly inflated state is first created in a hub-shaped and spoke-shaped area of the airbag 3 extending from the center 4b of the intermediate panel 4 to the extension portions 4a along the gas duct 51 and a rim-shaped area extending the entire circumference of the ring-shaped seam 10 of the airbag 3.

The inflator gas that flows from the gas duct 51 into the airbag 3 through the gas circulation holes 11 according to the control of the intermediate panel 4 determines the position of the airbag 3 in the vertical and horizontal directions of the vehicle in the initial stage of deployment and inflation of the airbag 3 and generates the gas flow G1 along the ring-shaped seam 10. Thus, it is possible to suppress the airbag 3 from swinging in the vertical and horizontal directions of the vehicle.

Subsequently, the inflator gas that is discharged from the gas circulation holes 11 and flows along the ring-shaped seam 10 is filled at once into the airbag 3 with confronting flows colliding with each other, and the front panel 1 can be inflated and deployed toward the vehicle seat 9.

The vehicle airbag structure according to the present embodiment described above includes: the intermediate panel 4 provided to be superimposed between the front panel 1 and the rear panel 2; the ring-shaped seam 10 joining at least the rear panel 2 and the front panel 1 in a ring shape to form the airbag 3; the duct seam 50 joining the intermediate panel 4 and the rear panel 2 to form the gas duct 51 between the intermediate panel 4 and the rear panel 2 so as to guide the inflator gas from the gas inlet portion; and the gas circulation hole 11 communicating with the gas duct 51, formed by the peripheral edge of the intermediate panel 4 so as to face in the circumferential direction of the ring-shaped seam 10 to generate, inside the airbag 3, the gas flow G1 of the inflator gas in the circumferential direction of the ring-shaped seam 10. Thus, according to the control of the inflator gas by the gas duct 51 and the gas circulation hole 11, a preliminary deployment and inflation portion having a hub and spoke shape is set inside the airbag 3, and in particular, a rim-shaped preliminary deployment and inflation portion extending in a ring shape is set between the vehicle seat 9 and the vehicle body 7 to which the airbag 3 is fixed. Thus, the airbag 3 can be quickly and stably deployed at a predetermined designed position in the initial stage of deployment while suppressing a swinging motion in the vertical and horizontal directions of the vehicle.

Figure 4:
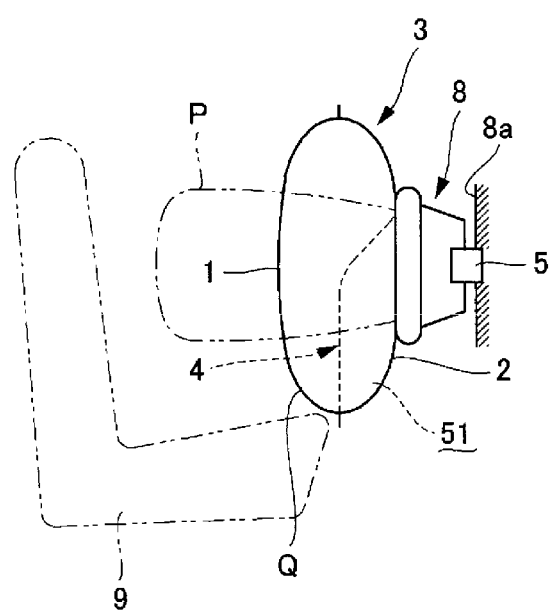
FIG. 4 is a schematic side view for explaining an operation of the vehicle airbag structure shown in FIG. 1.

Further, due to the preliminary deployment and inflation portion extending in a ring shape, formed by the gas flow G1 flowing in the circumferential direction of the ring-shaped seam 10, as shown in FIG. 4, it is possible to prevent the airbag 3 from inflating and deploying (see an imaginary line P in the figure) so as to project toward the vehicle seat 9 to punch on an occupant when the gas flow flows toward the front panel 1. Moreover, when the airbag 3 inflates continuously, it is possible to allow the front panel 1 to appropriately deploy toward the vehicle seat 9 (see a solid line Q in the figure) and to reliably receive the occupant at an appropriate position to appropriately reduce the risk of injuries to the occupant.

Since the gas circulation holes 11 discharge the inflator gas evenly in the horizontal direction, it is possible to stabilize the motion of the ring-shaped seam 10 serving as the rim-shaped portion. The extension portions 4a in which the gas circulation holes 11 are formed are disposed approximately at an equal interval in the circumferential direction of the ring-shaped seam 10. Due to this configuration, it is also possible to stabilize the motion of the ring-shaped seam 10.

Since the center 4b of the intermediate panel 4 corresponds to the position of the fitting hole 6 of the inflator 5, it is possible to stabilize the swelling of the gas duct 51 and to allow the inflator gas to circulate approximately evenly to the respective gas circulation holes 11. Since the gas circulation holes 11 are formed around the outermost peripheral edge 4c of the intermediate panel 4 that reaches the ring-shaped seam 10, it is possible to appropriately generate the gas flow G1 along the inner edge of the ring-shaped seam 10 of the airbag 3.

Since the penetration holes 12 are formed, it is possible to accelerate smooth deployment of the front panel 1 and to appropriately protect the occupant. By adjusting the hole diameter, the number, and the positions of the penetration holes 12, it is possible to freely adjust a deployment pattern of the front panel 1.

Figure 5:
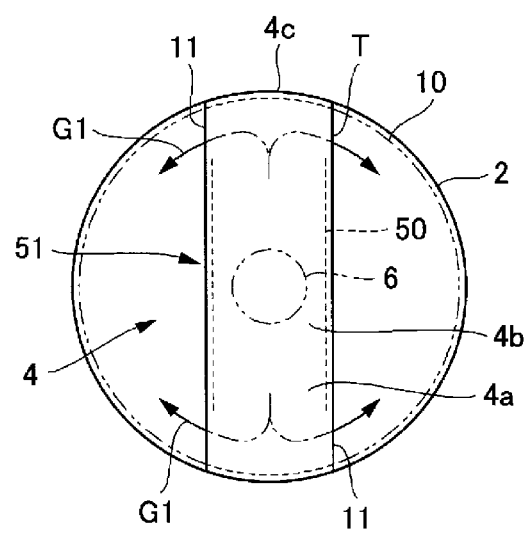
FIG. 5 is a front view of a state where a front panel is removed, showing a modification of the first embodiment.
Figure 6:
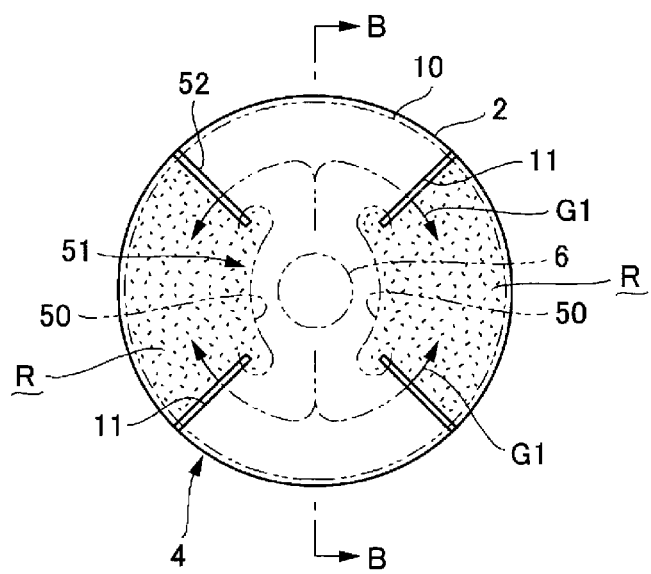
FIG. 6 is a front view of a state where a front panel is removed, showing a second embodiment of the vehicle airbag structure according to the present invention.
Figure 7:
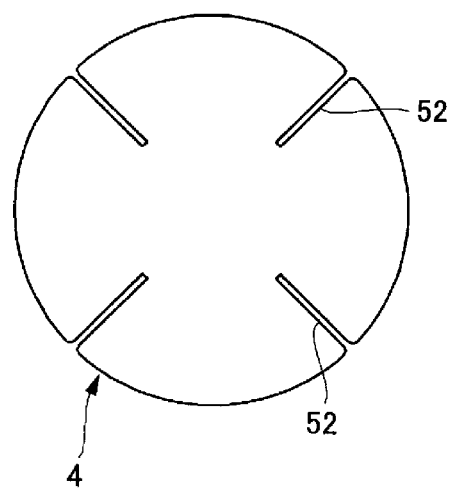
FIG. 7 is a front view of an intermediate panel used in the second embodiment.

FIG. 5 shows a modification of the first embodiment. In this modification, an I-shaped or a linear strip-shaped intermediate panel 4 is used instead of the Y-shaped intermediate panel 4. The gas circulation hole 11 is formed at both ends in the longitudinal direction of the intermediate panel 4 similarly to the first embodiment. Since the intermediate panel 4 has an I-shape, the intermediate panel 4 can be appropriately employed when a vertical or a horizontal direction is set to the airbag 3. Naturally, such a modification provides the same operational effects as the above embodiment.

Figure 8:
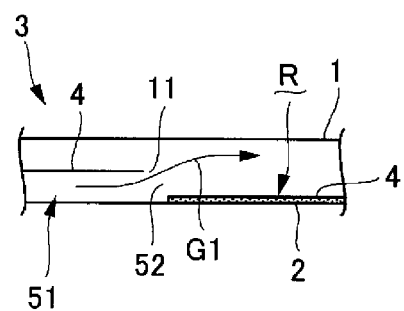
FIG. 8 is a cross-sectional side view showing the flow of an inflator gas according to the second embodiment.
Figure 9:
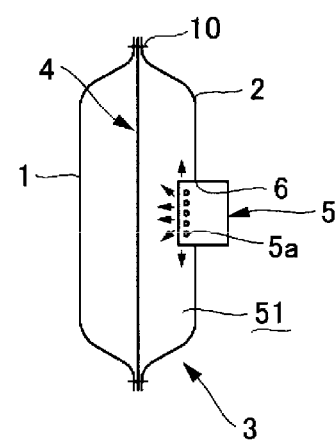
FIG. 9 is a cross-sectional view along line B-B in FIG. 6, showing a state where the front panel is attached.

FIGS. 6 to 9 show a second embodiment of the vehicle airbag structure according to the present invention. In the second embodiment, the intermediate panel 4 has a circular shape to match the external shape of the front panel 1 and the rear panel 2. Thus, the intermediate panel 4 is joined to the front panel 1 and the rear panel 2 by the ring-shaped seam 10. Slits 52 are formed in the intermediate panel 4 at positions corresponding to the distal side edges of the intermediate panel 4 of the first embodiment so as to correspond to the non-joined portions T of the peripheral edges, and the slits 52 form the gas circulation holes 11. In the shown example, four slits 52 are formed at an equal interval in the circumferential direction of the intermediate panel 4. The slits 52 may be formed by incising inward from the outer circumferential portion of the intermediate panel 4 and may be formed by forming narrow and long holes. The duct seam 50 joins the intermediate panel 4 and the rear panel 2 in a region from the fitting hole 6 to the slit 52, whereby the gas duct 51 is formed so as to face across the fitting hole 6 and the slit 52. In the shown example, two duct seams 50 are set with respect to four slits 52. Each duct seam 50 is formed across two adjacent slits 52. Thus, the gas duct 51 communicates with four slits 52, that is, four gas circulation holes 11. A region surrounded by the duct seam 50 and the two adjacent slits 52 connected by the duct seam 50 is configured as a non-inflating region R into which the inflator gas does not flow, by joining the surfaces of the intermediate panel 4 and the rear panel 2. Thus, after the inflator gas swells the gas duct 51, as shown in FIG. 8, the inflator gas flows into a space between the front panel 1 and the intermediate panel 4 through the gas circulation holes 11 to deploy the front panel 1 and to inflate the airbag 3. In the second embodiment, naturally, the gas flow G1 of the inflator gas flowing along the ring-shaped seam 10 is generated, and the same operational effects as the first embodiment are provided.

Figure 10:
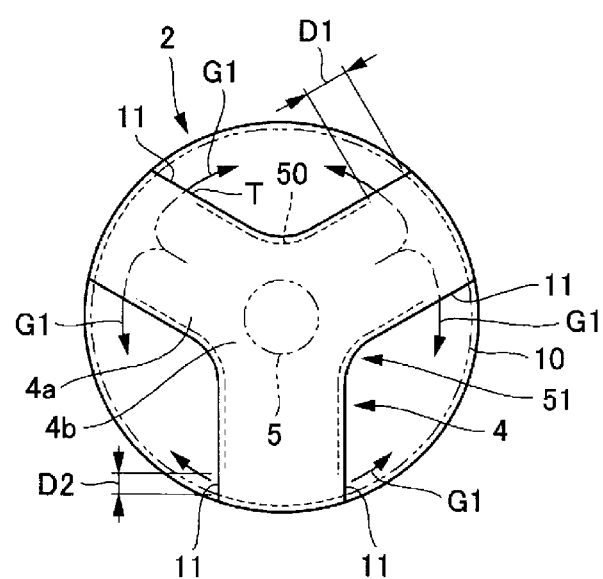
FIG. 10 is a front view of a state where a front panel is removed, showing a third embodiment of the vehicle airbag structure according to the present invention.

FIG. 10 shows a third embodiment of the vehicle airbag structure according to the present invention. In the third embodiment, a plurality of gas circulation holes 11 is formed, and these gas circulation holes 11 have different hole diameters in order to adjust the volume of inflator gas discharged from each of the gas circulation holes 11. With such a configuration, it is possible to freely control a deployment and inflation motion of the rim-shaped preliminary deployment and inflation portion of the airbag 3 in the circumferential direction of the ring-shaped seam 10.

For example, when the upper portion of the airbag 3 has a large load and the lower portion has a small load due to the layout of a lid that covers a storage space, the load can be balanced by setting the hole diameter D1 of the upper gas circulation hole 11 to be larger than the hole diameter D2 of the lower gas circulation hole 11 (D1>D2) in order to discharge a large volume of inflator gas from the upper gas circulation hole 11. Thus, it is possible to equalize the deployment and inflation action of the upper and lower portions of the airbag 3. In the third embodiment, naturally, the gas flow G1 of the inflator gas flowing along the ring-shaped seam 10 is generated, and the same operational effects as the first embodiment are provided.

Figure 11:
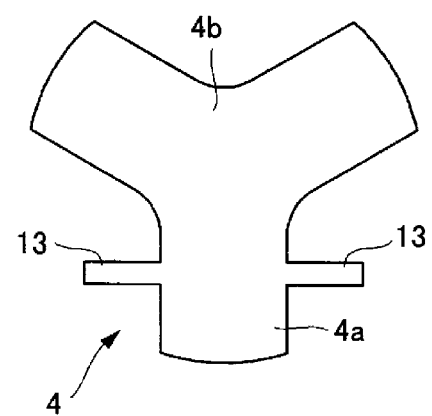
FIG. 11 is a front view showing an intermediate panel applied to a fourth embodiment of the vehicle airbag structure according to the present invention.
Figure 12:
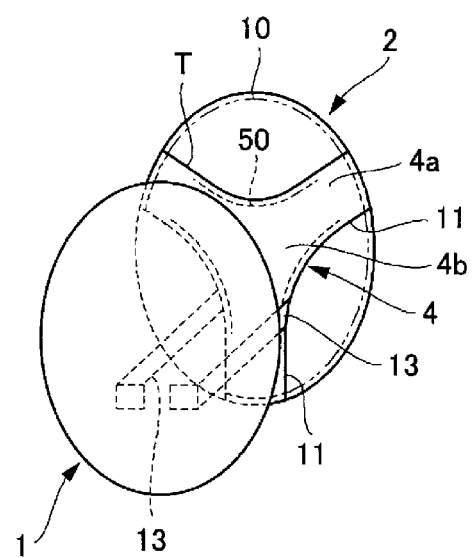
FIG. 12 is a perspective view showing a state where a tether of the intermediate panel shown in FIG. 11 is connected to a front panel.
Figure 13:
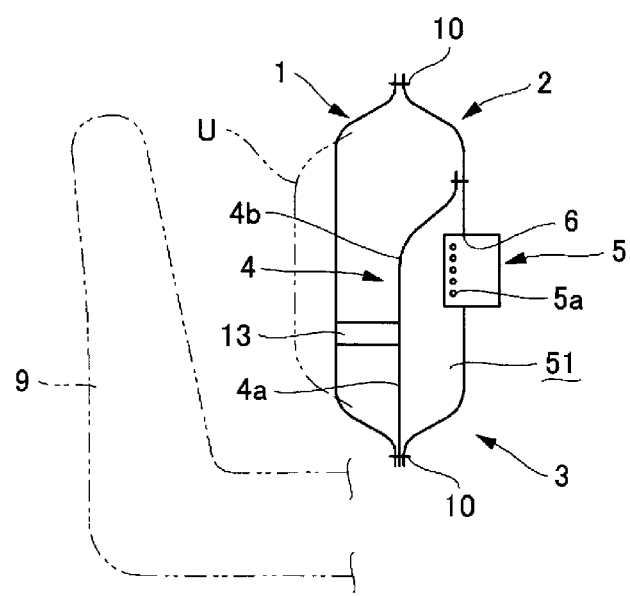
FIG. 13 is a schematic cross-sectional side view of the vehicle airbag structure shown in FIG. 11.

FIGS. 11 to 13 show a fourth embodiment of the vehicle airbag structure according to the present invention. In the fourth embodiment, tethers 13 connected to the front panel 1 are provided in the intermediate panel 4 in order to control deployment and inflation of the front panel 1 using the intermediate panel 4. In the shown example, base ends of a pair of left and right tethers 13 are connected to both sides in the width direction of the extension portion 4a that forms the Y-shaped intermediate panel 4, and the distal ends of the tethers 13 are connected to an appropriate position of the front panel 1. The position and the number of tethers 13 are not limited to the shown example but can be set optionally.

In general, the tethers 13 function at the connected portions only, and it is difficult to properly control non-connected portions. In the vehicle airbag structure according to the present embodiment, as described in the first embodiment, the rim-shaped preliminary deployment and inflation portion prevents the front panel 1 from projecting toward the vehicle seat 9 (see an imaginary line U in the figure). By adding the tethers 13 to this configuration, it is possible to easily and appropriately adjust a slight deployment and inflation pattern of the front panel 1. In the fourth embodiment, naturally, the gas flow G1 of the inflator gas flowing along the ring-shaped seam 10 is generated, and the same operational effects as the first embodiment are provided.

Figure 14:
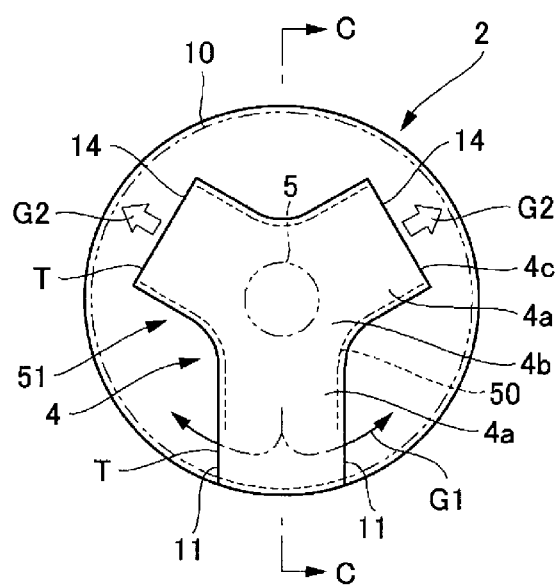
FIG. 14 is a front view of a state where a front panel is removed, showing a fifth embodiment of the vehicle airbag structure according to the present invention.
Figure 15:
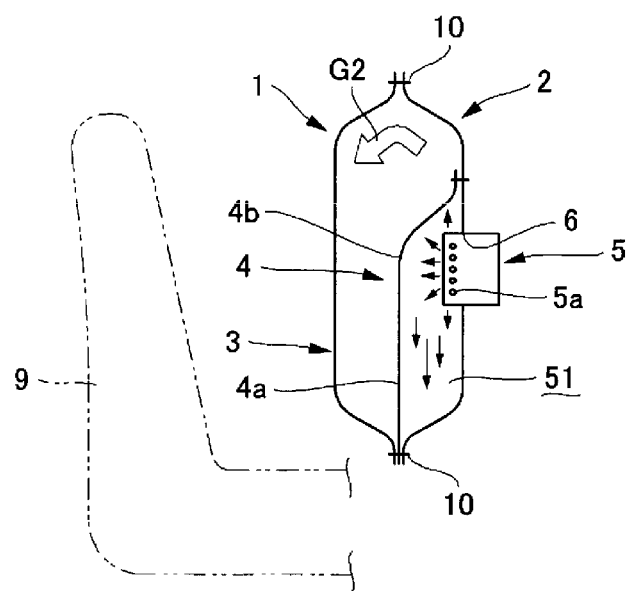
FIG. 15 is a cross-sectional view along line C-C in FIG. 14, showing a state where the front panel is attached.
Figure 16:
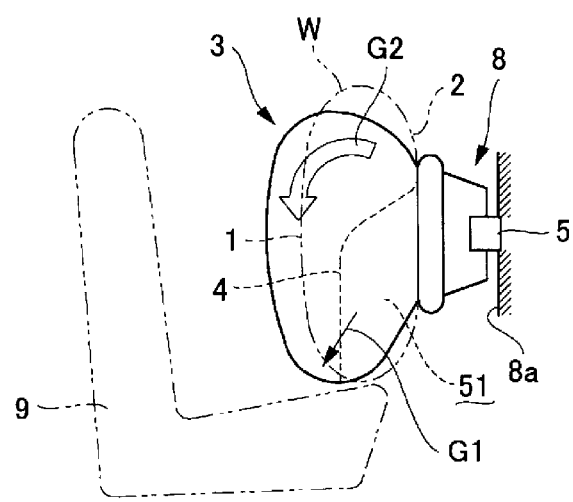
FIG. 16 is a schematic side view for explaining an operation of the vehicle airbag structure shown in FIG. 14.

FIGS. 14 to 16 show a fifth embodiment of the vehicle airbag structure according to the present invention. In the fifth embodiment, additional gas circulation holes 14 are formed by the peripheral edges of the intermediate panel 4. The additional gas circulation holes 14 communicate with the gas duct 51. The additional gas circulation holes 14 are formed in a direction of facing the ring-shaped seam 10 in order to generate, inside the airbag 3, a gas flow G2 of the inflator gas toward the ring-shaped seam 10 so that the inflator gas flows strongly toward the front side of the airbag 3 rather than flowing in the circumferential direction of the ring-shaped seam 10.

In the shown example, in the same configuration as shown in FIG. 1, the extension portions 4a of the Y-shaped intermediate panel 4 facing the ring-shaped seam 10 are set to such positions that the extension portions 4a do not reach the ring-shaped seam 10, and the outermost peripheral edges 4c thereof are configured as non-joined portions T of the duct seam 50, whereby additional gas discharging holes 14 are formed.

The gas flow G2 of the inflator gas discharging from the additional gas discharging holes 14 change its direction at the ring-shaped seam 10, a portion of the inflator gas flows along the surface of the rear panel 2, and most of the inflator gas flows along the surface of the deploying front panel 1 to deploy and inflate the front panel 1 toward the front side of the airbag 3 while swelling the periphery of the ring-shaped seam 10.

As a result, due to the gas flow G1 from the gas circulation holes 11, it is possible to quickly and stably deploy the airbag 3 at a predetermined designed position while suppressing a swinging motion in the vertical and horizontal directions of the vehicle and to quickly deploy the front panel 1 toward the vehicle seat 9 to inflate the airbag 3. Further, it is possible to adjust the deployment and inflation motion of the entire airbag 3 and to further improve an occupant protection performance.

In particular, as shown in FIGS. 15 and 16, when the gas circulation holes 11 are set in the lower part, and the additional gas discharging holes 14 are set to face upward, it is possible to allow the inflator gas discharged from the gas circulation holes 11 to a portion near the lower portion of the ring-shaped seam 10 of the airbag 3 to suppress floating of the airbag 3 (see an imaginary line W in the figure). At the same time, it is possible to allow the inflator gas discharged upwardly from the additional gas discharging holes 14 and flowing along the surface of the front panel 1 near the upper portion of the ring-shaped seam 10 to quickly deploy the front panel 1 toward the vehicle seat 9. Thus, it is possible to maintain the deployment and inflation position of the airbag 3 and to accelerate the action of deployment and inflation toward the occupant. In the fifth embodiment, naturally, the gas flow G1 of the inflator gas flowing along the ring-shaped seam 10 is generated, and the same operational effects as the first embodiment are provided.

Figure 17:
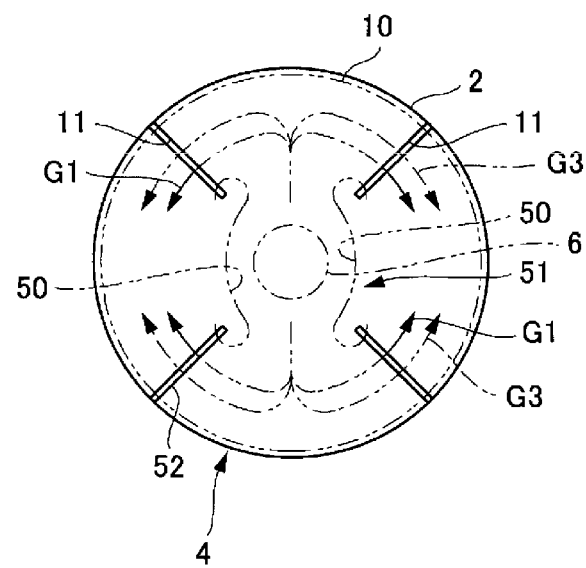
FIG. 17 is a front view of a state where a front panel is removed, showing a sixth embodiment of the vehicle airbag structure according to the present invention.
Figure 18:
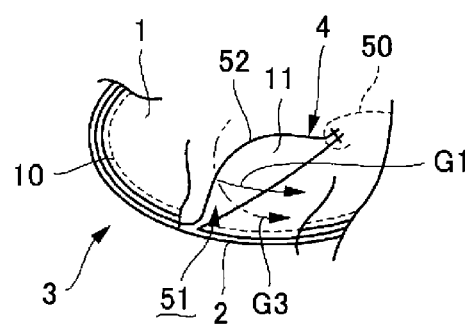
FIG. 18 is a partially cutaway perspective view of FIG. 17, showing a state where the front panel is attached.
Figure 19:
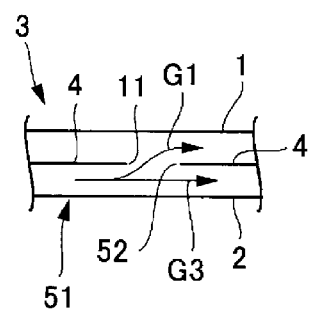
FIG. 19 is a cross-sectional side view showing the flow of an inflator gas in the sixth embodiment.

FIGS. 17 to 19 show a sixth embodiment of the vehicle airbag structure according to the present invention. In the sixth embodiment, the non-inflating region R of the second embodiment is not used. In the sixth embodiment, a portion (G1) of the inflator gas circulating in the gas duct 51 flows into a space between the intermediate panel 4 and the front panel 1 through the gas circulation holes 11, and the remaining inflator gas (G3) flows into a space between the intermediate panel 4 and the rear panel 2 without passing through the gas circulation holes 11. Any of the gas flows G1 and G3 of the inflator gas circulates in the circumferential direction of the ring-shaped seam 10. Due to this, the front panel 1 and the rear panel 2 are deployed so that the entire airbag 3 is inflated. In the sixth embodiment, a portion G3 of the inflator gas can be circulated to the rear panel 2. Thus, by adjusting the size of the slit 52, it is possible to control the deployment motion of the front panel 1 toward the vehicle seat 9 in the initial stage of deployment of the airbag 3. In the sixth embodiment, naturally, the gas flow G1 of the inflator gas flowing along the ring-shaped seam 10 is generated, and the same operational effects as the first embodiment are provided.

FIGS. 20 to 24 show a seventh embodiment of the vehicle airbag structure according to the present invention. In the seventh embodiment, a hollow gas duct 54 (see FIG. 21) in which two overlapping upper and lower panels are appropriately seam-joined to form a seam-joined panel 55 is used instead of the intermediate panel 4. Thus, in the seventh embodiment, the duct seam 50 for joining to the rear panel 2 is not formed. In the single gas duct 54, an insertion hole 15 is formed in any one of the front and rear surfaces thereof as a gas inlet portion communicating with the fitting hole 6, and the gas discharging holes 5a of the inflator 5 are positioned inside the hollow of the gas duct 54 through the insertion hole 15. Thus, the inflator gas from the inflator 5 is discharged into the hollow gas duct 54.

Figure 20:
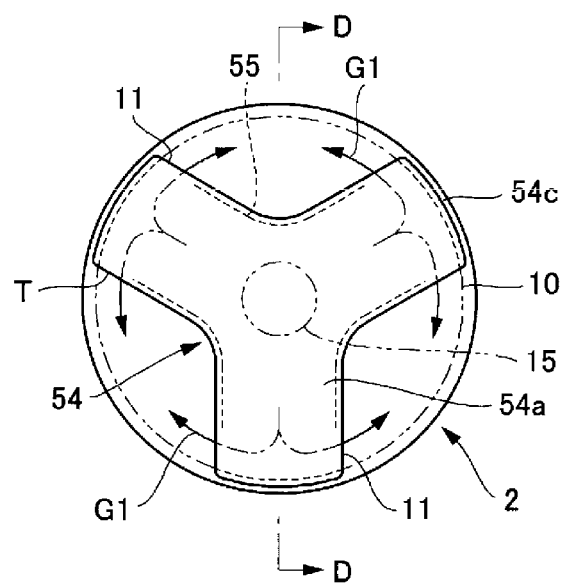
FIG. 20 is a front view of a state where a front panel is removed, showing a seventh embodiment of the vehicle airbag structure according to the present invention.
Figure 21:
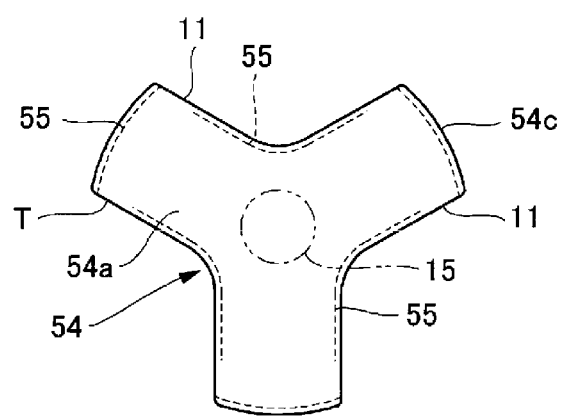
FIG. 21 is a front view of a gas duct used in the seventh embodiment.
Figure 22:
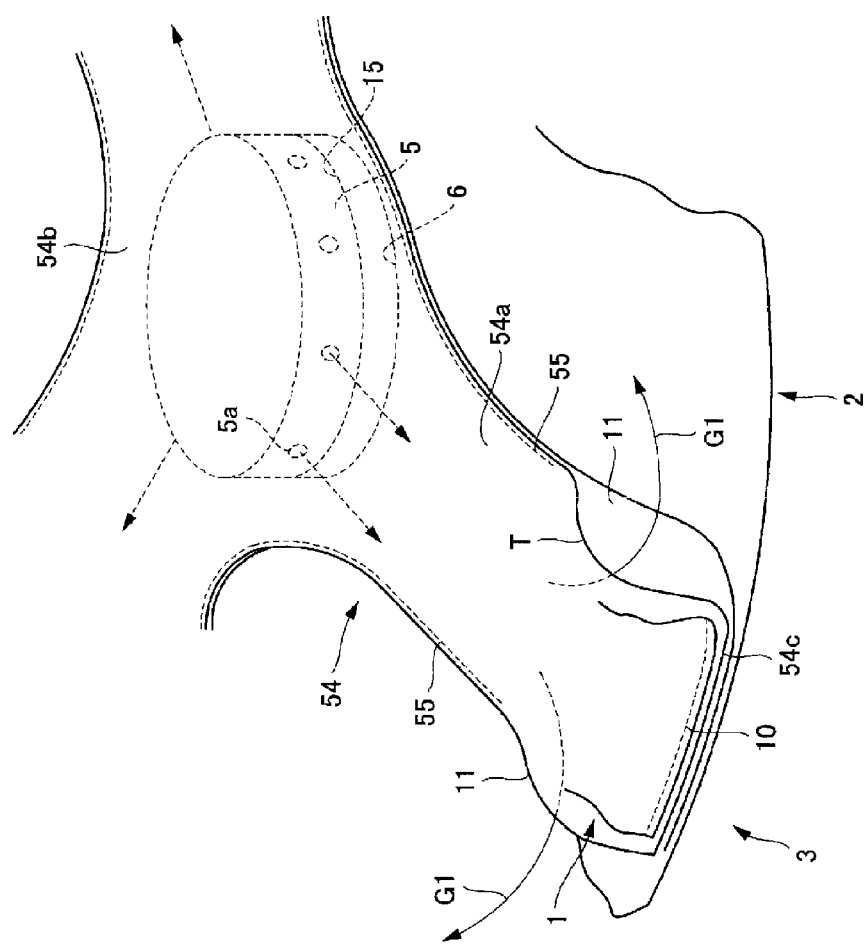
FIG. 22 is a partially cutaway perspective view showing a state where the front panel is attached in the seventh embodiment.
Figure 23:
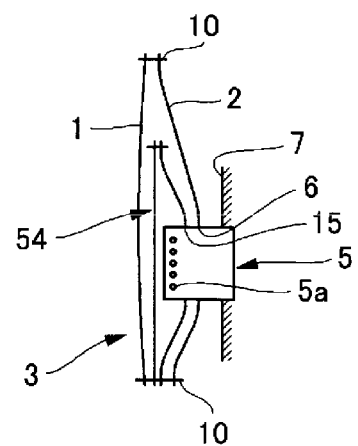
FIG. 23 is a cross-sectional view along line D-D in FIG. 20, showing a state where the front panel is attached.
Figure 24:
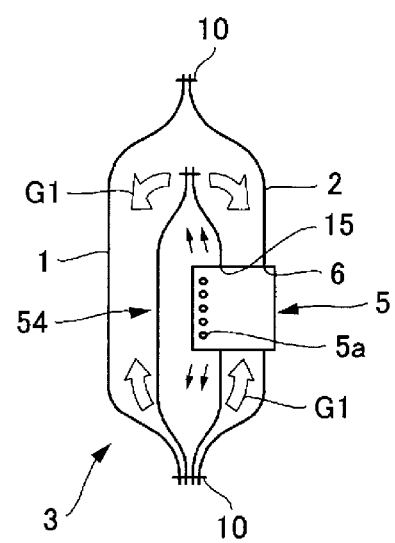
FIG. 24 is a cross-sectional side view showing an inflated state of an airbag in the seventh embodiment.

As shown in FIGS. 20 and 22, the outermost peripheral edge 4c of the gas duct 54 is joined to the front panel 1 and the rear panel 2 by the ring-shaped seam 10. The gas duct 54 may be joined to any one of the front panel 1 and the rear panel 2. Further, the gas duct 54 is fixed to the vehicle body 7 by the inflator 5. In the seventh embodiment, a pair of gas circulation holes 11 is formed on both sides in the width direction of the extension portion 54a of the gas duct 54 by the non-joined portion T of the seam-joined panel 55 so as to face in the circumferential direction of the ring-shaped seam 10. The inflator gas discharged from the gas circulation holes 11 generates, inside the airbag 3, the gas flow G1 of the inflator gas in the circumferential direction of the ring-shaped seam 10, and similarly to the first embodiment, forms a rim-shaped preliminary deployment and inflation portion along the circumferential direction of the airbag 3. The additional gas circulation holes 14 described in the fifth embodiment may be formed in the gas duct 54. In the seventh embodiment, naturally, the gas flow G1 of the inflator gas flowing along the ring-shaped seam 10 is generated, and the same operational effects as the first embodiment are provided.

The vehicle airbag structure described hereinabove is a preferred example of the present invention, and other embodiments may be implemented or executed using various methods. Unless specific limiting description is provided in the specification of this application, the present invention is not limited to the specific shapes, sizes, configurations, arrangements, and the like of the components illustrated in the accompanying drawings. Further, the expressions and terminology used in the specification of this application are provided for descriptive purposes, and unless specific limiting description is provided, the present invention is not limited to these expressions and terminology.

What is claimed is:

1. A vehicle airbag structure for deployment and inflation by inflator gas toward a seat within a vehicle, the vehicle airbag structure comprising:
a rear panel having portions defining a gas inlet through which inflator gas is received;
a front panel configured to be deployed and inflated toward the vehicle seat by the inflator gas;
an intermediate panel provided between the front panel and the rear panel, the intermediate panel having at least two radial arms;
a ring-shaped seam joining at least the rear panel and the front panel in a ring shape to form an airbag;
a plurality of duct seams extending along a substantially straight line and joining the intermediate panel and at least one of the rear panel and front panel to form a straight sided gas duct between the intermediate panel and the one other panel so as to guide the inflator gas from the gas inlet portion; and
a pair of gas circulation holes communicating with the gas duct and formed by a peripheral edge of the intermediate panel and termination of the duct seam along the substantially straight line, the pair of gas circulation holes opposing one another and facing in a circumferential direction generally along the ring-shaped seam so as to generate, inside the airbag, a gas flow of the inflator gas in the circumferential direction generally along the ring-shaped seam.

2. The vehicle airbag structure according to claim 1, wherein the peripheral edge is formed by a slit provided in the intermediate panel, and the gas duct is formed between the gas inlet portion and the slit.

3. The vehicle airbag structure according to claim 2, further comprising a plurality of slits, wherein a region bounded by two adjacent slits and the duct seam is configured as a non-inflating region and is further defined by joining the intermediate panel and the rear panel.

4. The vehicle airbag structure according to claim 1, wherein a penetration hole is defined in the intermediate panel whereby the inflator gas is received into the gas duct and thereafter into the airbag.

5. The vehicle airbag structure according to claim 1, further comprising a tether connected to the front panel and extending between the front panel and the intermediate panel, the tether controlling deployment and inflation of the front panel.

6. The vehicle airbag structure according to claim 1, further comprising an additional gas circulation hole defined in part by the peripheral edge of the intermediate panel, the additional gas circulation hole radially facing the ring-shaped seam and generating, inside the airbag, a gas flow of the inflator gas toward the ring-shaped seam.

7. The vehicle airbag structure according to claim 1, wherein the gas duct is formed between the intermediate panel and the rear panel.

8. The vehicle airbag structure according to claim 1, wherein each of the gas circulation holes are aligned with the duct seam along the substantially straight line.

9. The vehicle airbag structure according to claim 1, wherein the gas circulation hole is parallel with the duct seam along the substantially straight line.

10. A vehicle airbag structure for deployment and inflation by inflator gas toward a seat within a vehicle, the vehicle airbag structure comprising:
a rear panel attached and fixed to a body portion of the vehicle;
a front panel configured to be deployed and inflated toward the seat by the inflator gas;
a gas duct defined between the front panel and the rear panel so as to be joined to at least one of the rear panel and the front panel along a substantially straight line, the gas duct having a gas inlet portion for the inflator gas;
a ring-shaped seam joining the rear panel and the front panel in a ring shape to form an airbag; and
a gas circulation hole formed in the gas duct and defined in part by termination of a radially extending part of the gas duct being joined to the at least one of the rear panel and the front panel along the substantially straight line, the gas circulation hole facing in a circumferential direction and generally along the ring-shaped seam so as to generate, inside the airbag, a gas flow of the inflator gas in the circumferential direction along the ring-shaped seam.

11. The vehicle airbag structure according to claim 10, further comprising a radial gas circulation hole formed in the gas duct and facing in a direction toward the ring-shaped seam so as to generate, inside the airbag, an additional gas flow of the inflator gas toward the ring-shaped seam.

12. The vehicle airbag structure according to claim 10, wherein the vehicle airbag structure includes a plurality of gas circulation holes, and at least some of the gas circulation holes having different hole diameters that vary a flow rate of the inflator gas from each of the gas circulation holes.

13. The vehicle airbag structure according to claim 10, wherein each of the gas circulation holes are aligned with the substantially straight line joining the gas duct to at least one of the rear panel and the front panel.

14. The vehicle airbag structure according to claim 10, wherein the gas circulation hole is parallel to the substantially straight line joining the gas duct to at least one of the rear panel and the front panel.

15. A vehicle airbag structure for deployment and inflation by inflator gas toward a seat within a vehicle, the vehicle airbag structure comprising:
a rear panel having portions defining a gas inlet through which inflator gas is received;
a front panel configured to be deployed and inflated toward the vehicle seat by the inflator gas;
an intermediate panel provided between the front panel and the rear panel, the intermediate panel having at least two radial arms;
a ring-shaped seam joining at least the rear panel and the front panel in a ring shape to form an airbag;
a duct seam joining the intermediate panel and at least one of the rear panel and front panel to form a gas duct between the intermediate panel and the one other panel so as to guide the inflator gas from the gas inlet portion;
a circulation hole communicating with the gas duct and formed by a peripheral edge of the intermediate panel and termination of a radially extending part of the duct seam, the gas circulation hole facing in a circumferential direction generally along the ring-shaped seam so as to generate, inside the airbag, a gas flow of the inflator gas in the circumferential direction generally along the ring-shaped seam;
at least one additional gas circulation hole defined in part by the peripheral edge of the intermediate panel and by termination of a radially extending part of the duct seam, the additional gas circulation hole radially facing the ring-shaped seam and generating, inside the airbag, a gas flow of the inflator gas toward the ring-shaped seam; and wherein the intermediate panel includes three radial arms that are equally spaced apart, two of the radial arms terminating the additional gas circulation holes radially facing the ring-shaped seam and one of the radial arms terminating in the gas circulation hole facing in the circumferential direction.

16. The vehicle airbag structure according to claim 15, wherein the one of the radial arms terminating in the gas circulation hole facing in the circumferential direction extends in a downward direction relative to the vehicle.

17. The vehicle airbag structure according to claim 15, wherein the additional gas circulation holes are spaced apart from the ring-shaped seam.

* * * * *